(12) United States Patent
Malvankar et al.

(10) Patent No.: US 11,789,774 B2
(45) Date of Patent: Oct. 17, 2023

(54) OPTIMIZATION OF WORKLOAD SCHEDULING IN A DISTRIBUTED SHARED RESOURCE ENVIRONMENT

(71) Applicant: International Business Machines Corporation, Armonk, NY (US)

(72) Inventors: Abhishek Malvankar, White Plains, NY (US); John M. Ganci, Jr., Raleigh, NC (US); Ashok Pon Kumar Sree Prakash, Bangalore (IN); Umamaheswari Devi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 17/180,948

(22) Filed: Feb. 22, 2021

(65) Prior Publication Data
US 2022/0269531 A1 Aug. 25, 2022

(51) Int. Cl.
*G06F 40/00* (2020.01)
*G06F 9/48* (2006.01)
(Continued)

(52) U.S. Cl.
CPC ............ *G06F 9/4881* (2013.01); *G06F 16/35* (2019.01); *G06F 40/279* (2020.01); *G06N 3/042* (2023.01); *G06N 3/08* (2013.01); *G06F 40/205* (2020.01)

(58) Field of Classification Search
CPC .......... G06N 3/08; G06N 20/00; G06N 3/045; G06N 5/025; G06N 3/082; G06N 3/09;
(Continued)

(56) References Cited

U.S. PATENT DOCUMENTS 8,302,093 B2 10/2012 Berg et al.
8,612,976 B2 12/2013 Arnold et al.
(Continued)

OTHER PUBLICATIONS

D. B. Prats, J. L. Berral and D. Carrera, "Automatic Generation of Workload Profiles Using Unsupervised Learning Pipelines," in IEEE Transactions on Network and Service Management, vol. 15, No. 1, pp. 142-155, Mar. 2018, doi: 10.1109/TNSM.2017.2786047. (Year: 2018).*

(Continued)

*Primary Examiner* — Edgar X Guerra-Erazo
(74) *Attorney, Agent, or Firm* — Lieberman & Brandsdorfer, LLC

(57) ABSTRACT

An artificial intelligence (AI) platform to support optimization of workload scheduling in a distributed computing environment. Unstructured data corresponding to one or more application artifacts related to a workload in the distributed computing environment is leveraged. NLP is applied to the unstructured data to identify one or more host requirements corresponding to the application artifacts. One or more hosts in the computing environment compatible with the identified host requirements are selectively identified and compatibility between the application artifacts and the identified hosts is assessed. The workload is selectively scheduled responsive to the selective host identification based on the assessed compatibility. The scheduled workload is selectively executed on at least one of the selectively identified hosts responsive to the assessment workload compatibility.

18 Claims, 7 Drawing Sheets

(51) Int. Cl.
*G06N 3/08* (2023.01)
*G06F 16/35* (2019.01)
*G06F 40/279* (2020.01)
*G06N 3/042* (2023.01)
*G06F 40/205* (2020.01)

(58) Field of Classification Search
CPC ...... G06N 3/0895; G06N 3/088; G06N 3/091; G06N 3/092; G06N 3/094; G06N 3/096; G06N 3/098; G06N 3/0985; G06N 3/10; G06N 10/40; G06N 10/60; G06N 10/80; G06F 40/30; G06F 18/24; G06F 40/20; G06F 16/243; G06F 16/30; G06F 18/2185; G06F 40/295; G06F 40/247; G06F 18/24765; G06F 40/279; G06F 40/58; G06F 40/40; G06F 40/00; G06F 2221/2141; G06F 9/50; G06F 9/5083; G06F 16/27; G06F 16/3329; G06F 16/335; G06F 16/90332; G06F 21/566; G06F 2221/034; G06F 2221/033; G06F 2221/032; G06F 2221/031; G06F 2221/2113; G06F 2221/2129; G06F 2221/2139; G06F 2221/2149; G06F 21/567; H04L 47/70; G06Q 10/0631; G06Q 10/06312

See application file for complete search history.

(56) References Cited

U.S. PATENT DOCUMENTS

| | | | |
|---|---|---|---|
| 9,063,746 B2 | 6/2015 | Yousouf et al. | |
| 9,397,944 B1 | 7/2016 | Hobbs et al. | |
| 9,405,529 B2 | 8/2016 | Berg et al. | |
| 9,542,219 B1 | 1/2017 | Bryant et al. | |
| 9,910,652 B2 | 3/2018 | Chen et al. | |
| 10,048,957 B2 | 8/2018 | Li et al. | |
| 10,402,187 B2 | 9/2019 | Turovsky et al. | |
| 2002/0073415 A1 | 6/2002 | Kim et al. | |
| 2015/0205596 A1 | 7/2015 | Hiltegen et al. | |
| 2015/0263983 A1 | 9/2015 | Brennan et al. | |
| 2017/0093639 A1* | 3/2017 | Dabbagh | H04L 41/12 |
| 2018/0046446 A1 | 2/2018 | Turovsky | |
| 2019/0052550 A1 | 2/2019 | Mordani et al. | |
| 2019/0213099 A1* | 7/2019 | Schmidt | G06N 3/044 |
| 2020/0104174 A1* | 4/2020 | Vlcek | G06N 3/044 |
| 2021/0191759 A1* | 6/2021 | Fong | G06N 20/00 |
| 2022/0129316 A1* | 4/2022 | Sheoran | G06F 9/5027 |
| 2022/0253689 A1* | 8/2022 | Lange | G06N 3/08 |

OTHER PUBLICATIONS

Tarsa, S. J., Kumar, A. P., & Kung, H. T. (May 2014). Workload prediction for adaptive power scaling using deep learning. In 2014 IEEE International Conference on IC Design & Technology (pp. 1-5). IEEE. (Year: 2014).*

Amaral, M., Polo, J., Carrera, D., Seelam, S., & Steinder, M. (Nov. 2017). Topology-aware gpu scheduling for learning workloads in cloud environments. In Proceedings of the International Conference for High Performance Computing, Networking, Storage and Analysis (pp. 1-12). (Year: 2017).*

I. Mytilinis, C. Bitsakos, K. Doka, I. Konstantinou and N. Koziris, "The Vision of a HeterogeneRous Scheduler," 2018 IEEE International Conference on Cloud Computing Technology and Science (CloudCom), Nicosia, Cyprus, 2018, pp. 302-307, doi: 10.1109/CloudCom2018.2018.00065. (Year: 2018).*

* cited by examiner

OPTIMIZATION OF WORKLOAD SCHEDULING IN A DISTRIBUTED SHARED RESOURCE ENVIRONMENT

BACKGROUND

The present embodiments relate to optimizing workload scheduling and provisioning in a distributed shared resource environment. More specifically, the embodiments relate to leveraging artificial intelligence and corresponding techniques to schedule the workload in the distributed shared resource environment.

Information technology refers to computing technology, such as networking, hardware, and software. Software is directed at computer programs that operate or run on virtual and physical hardware devices. Hardware refers to physical elements and components that support or enable the software to execute. Specific hardware structures, also referred to herein as a hardware platform, are a set of compatible hardware on which software applications can be processed. Application workload scheduling is multi-faceted, and includes identification of workload support and identification of a configured host with hardware and software to support the workload.

The advancement of computing techniques in the field of artificial intelligence (AI) and machine learning (ML), scheduling or workload has become multi-faceted. Such technique advancements require an installed driver on a provisioned host, as well as a toolkit which builds and runs corresponding workload program code. The driver is a software component(s) that allows communication between the operating system and a corresponding hardware device. The toolkit, also referred to herein as toolkit software, is a utility program in the form of a set of software routines or a complete integrated set of software utilities, which are used to develop and maintain applications. Software releases for different hardware architecture often makes the driver and the toolkit software incompatible, which extends the complexity and challenges of workload scheduling. A workload scheduled for an incompatible cloud environment results in the workload failing to execute.

SUMMARY

The embodiments include a system, computer program product, and method for leveraging artificial intelligence to optimize workload scheduling and provisioning in a distributed shared resource environment. This Summary is provided to introduce a selection of representative concepts in a simplified form that are further described below in the Detail Description. This Summary is not intended to identify key features or essential features of the claimed subject matter, nor is it intended to be used in any way that would limit the scope of the claimed subject matter.

In one aspect, a computer system is provided with a processing unit operatively coupled to memory, and an artificial intelligence (AI) platform operatively coupled to the processing unit. The AI platform supports optimization of workload scheduling in a distributed computing environment. The AI platform includes tools in the form of a data manager, a natural language processing (NLP) manager, a director, and a scheduling manager, with the tools configured with functionality to support and enable the workload optimization and scheduling. The data manager is configured to leverage one or more application artifacts related to a workload to identify host requirement data. The NLP manager, which is operatively coupled to the data manager, is configured to apply NLP to the data, the NLP to identify one or more host requirements corresponding to the application artifacts. The director, which is shown operatively coupled to the NLP manager, is configured to selectively identify one or more hosts in the computing environment and assess compatibility between the application artifacts and the identified one or more hosts. The scheduling manager, which is shown operatively coupled to the director, is configured to selectively schedule the workload responsive to the selective host identification based on the assessed compatibility. In an exemplary embodiment, the NLP manager applies the unstructured data to an artificial neural network (ANN), and further leverages one or more ML techniques to identify the one or more host requirements and selectively execute the scheduled workload on the identified host. The processing unit selectively executes the scheduled workload on at least one of the selectively identified hosts responsive to the assessment workload compatibility.

In another aspect, a computer program product is provided to support optimization of workload scheduling in a distributed computing environment. The computer program product includes a computer readable storage medium having program code embodied therewith. Program code, which is executable by a processor, is provided to leverage one or more application artifacts related to a workload to identify host requirement data. NLP is applied to the data to identify one or more host requirements corresponding to the application artifacts. Program code is provided to selectively identify one or more hosts in the computing environment and assess compatibility between the application artifacts and the identified one or more hosts. The workload is selectively scheduled responsive to the selective host identification based on the assessed compatibility. In an exemplary embodiment, program code is configured to apply the unstructured data to an artificial neural network (ANN), and further leverages one or more ML techniques to identify the one or more host requirements and selectively execute the scheduled workload on the identified host. Program code is further provided to selectively execute the scheduled workload on at least one of the selectively identified hosts responsive to the assessment workload compatibility.

In yet another aspect, a method is provided to support optimization of workload scheduling in a distributed computing environment. The method includes leveraging one or more application artifacts related to a workload to identify host requirement data. NLP is applied to the data to identify one or more host requirements corresponding to the application artifacts. One or more hosts in the computing environment compatible with the identified host requirements are selectively identified, and compatibility between the application artifacts and the identified one or more hosts are assessed. The workload is selectively scheduled responsive to the selective host identification based on the assessed compatibility. In an exemplary embodiment, the unstructured data is applied to an artificial neural network (ANN), and one or more ML techniques are leveraged to identify the one or more host requirements and selectively execute the scheduled workload on the identified host. The scheduled workload is selectively executed on at least one of the selectively identified hosts responsive to the assessment workload compatibility.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
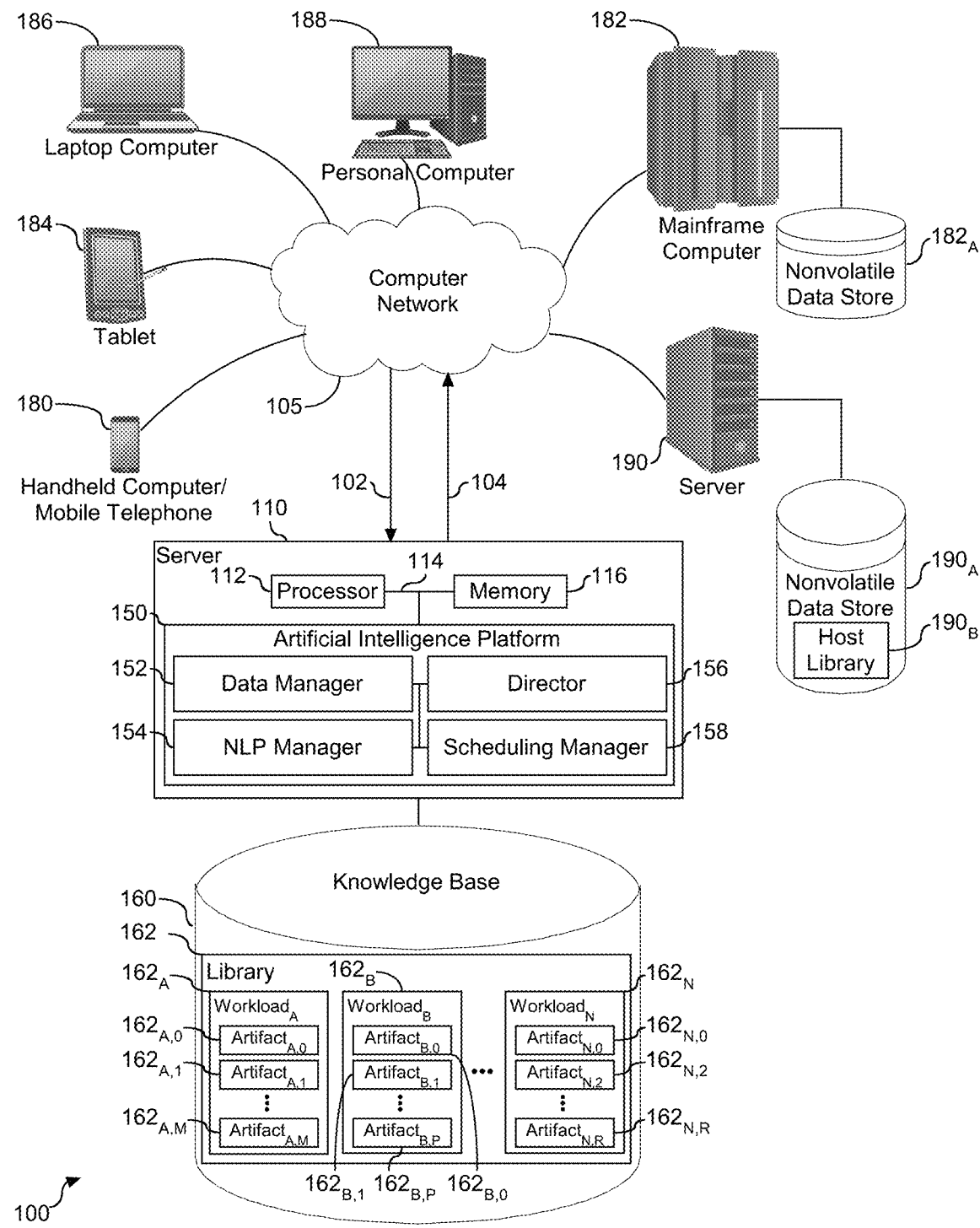
FIG. 1 depicts a schematic diagram of a computer system to support and enable optimization of workload scheduling.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing (NLP) to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly, particularly in the environment of a pipeline for delivering software. Existing solutions for efficiently identifying objects and processing content, as well as changes to the structures, are extremely difficult at a practical level.

Cloud computing provides dynamically scalable resources as a service over the Internet. Cloud computing provides a reduction in capital expenditure as well as operational expenditure. In cloud computing, there are still some challenges need to be solved. Among them, workload scheduling is one of the important issues, since the objective of the service provider and the cloud user is to utilize the computing resources efficiently. A workload refers to a computer system's ability to handle and process work. In cloud computing, workload scheduling is the process of assigning workloads to appropriate cloud computing environments. However, software releases for different hardware architecture can often make the drivers, e.g. software component(s) that allows communication between the operating system and a corresponding hardware device, and toolkit software incompatible with the cloud environment. A workload scheduled for an incompatible cloud environment results in the workload failing to execute.

It is understood in the cloud computing environment that hardware resources may be shared among a plurality of clients. Workloads are commonly subject to scheduling in order to manage resource allocation. In addition to hardware compatibility with the software as dictated by the configuration file, availability of the hardware resources is another factor that weighs on consideration. For example, in some cases the wait time to process a scheduled workload on a cloud environment can be several days or even a week long. Failed workloads directly impact productivity and waste resources for users scheduling the workloads. Accordingly, application of a configuration with respect to scheduling a workload should optimally account for availability in conjunction with compatibility.

As shown and described, a computer system, program product, and method are provided for utilizing driver, software and application artifact information to identify compatibility between a workload and a cloud environment before scheduling occurs. An application artifact is known in the art as a tangible by-product produced during development of software. Examples of an application artifact include, but are not limited to, application source code, testing code, application programming interface (API) specifications, application configurations, deployment scripts, and variables. The application artifacts require specific computer hardware needed to run the associated workload. In an exemplary embodiment, the specific or necessary computer hardware to support the application artifacts are referred to as a framework or hardware framework, and may include elements such as random access memory (RAM), central processing unit (CPU), graphics processing unit (GPU), etc. The computer hardware elements shown and described herein are for exemplary purposes and should not be considered limiting. Based on these requirements, identifying a host, or multiple hosts, in the cloud environment that is compatible with the workload can be verified before scheduling of the workload occurs. Similarly, in an exemplary embodiment, it may be determined that there is no compatible existing host or if there is such a host but the capacity to support the workload on the compatible host is not available, a new compatible host may need to be configured or built based on the application artifacts to run workload.

Referring to FIG. 1, a schematic diagram of a computer system (100) is provided with tools to support a multi-faceted solution for provisioning and scheduling a workload in a distributed resource environment. As shown, a server (110) is provided in communication with a plurality of computing devices (180), (182), (184), (186), (188), and (190) across a network connection (105). The server (110) is configured with a processor (112) in communication with memory (116) across a bus (114). The server (110) is shown with an artificial intelligence (AI) platform (150) to support optimizing workload scheduling and provisioning in a distributed shared resource environment. More specifically, the AI platform (150) is configured with one or more tools to leverage unstructured data corresponding to application artifacts related to a workload, and to identify and schedule the workload on a compatible host. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. Other embodiments of the server (110) may be used with components, systems, sub-systems, and/or devices other than those that are depicted herein.

The artificial intelligence (AI) platform (150) is shown herein configured to receive input (102) from various sources. For example, the AI platform (150) may receive input across the network (105) and leverage a knowledge base (160), also referred to herein as a corpus or data source, to support optimizing workload scheduling and provisioning in a distributed shared resource environment. As shown, the knowledge base (160) is configured with a library (162) populated with workloads. Although only one library is shown and described herein, the quantity should not be considered limiting, and in an exemplary embodiment, the knowledge base (160) may be configured with a plurality of libraries. As shown, the library (162) is populated with data in the form of workloads, shown herein by way of example as workload$_A$ (162$_A$), workload$_B$ (162$_B$), and workload$_N$ (162$_N$). The quantity of workloads (162$_A$), (162$_B$), and (162$_N$) is for illustrative purposes and should not be considered limiting. Each workload is shown with a plurality of application artifacts, referred to as artifacts, including workload$_A$ (162$_A$) shown with artifact$_{A,0}$ (162$_{A,0}$), artifact$_{A,1}$ (162$_{A,1}$), and artifact$_{A,M}$ (162$_{A,M}$); workload$_B$ (162$_B$) shown with artifact$_{B,0}$ (162$_{B,0}$), artifact$_{B,1}$ (162$_{B,1}$), and artifact$_{B,P}$ (162$_{B,P}$); and workload$_N$ (162$_N$) shown with artifact$_{N,0}$ (162$_{N,0}$), artifact$_{N,1}$ (162$_{N,1}$) and artifact$_{N,R}$ (162$_{N,R}$). The quantity of artifacts is for illustrative purposes and should not be considered limiting. The application artifacts may represent application source code, testing code, application programming interface (API) specifications, application configurations, deployment scripts, and variables associated with each corresponding workload. In an embodiment, the application artifacts are software options corresponding to a workload. In an exemplary embodiment, one or more of the application artifacts contain information indicating version information with respect to the software for each workload.

The AI platform (150) is shown herein with several tools to support leveraging data corresponding to application artifacts related to a workload, identify a compatible host, and schedule the workload on the identified compatible host. In an exemplary embodiment, the leveraged data is unstructured data, also referred to herein as crowdsource data. The unstructured or crowdsource data is not explicitly or implicitly provided in the knowledge base (160). The AI platform (150) tools are shown herein as a data manager (152), a natural language processing (NLP) manager (154), a director (156), and a scheduling manager (158). The tools (152), (154), (156), and (158), are operatively coupled, directly or indirectly, together, and provide the functions, as described below.

The data manager (152) locates and leverages data, which in an embodiment is unstructured data, corresponding to the application artifacts (162$_{A,0}$)-(162$_{A,M}$) of a workload, i.e. workload$_A$ (162$_A$) as shown in library (162). In an embodiment, the application artifacts are provided by a user. The data manager (152) leverages or otherwise uses these provided or identified application artifacts to determine host requirements to run the workload. In an embodiment, the data manager (152) uses the application artifacts and submits them as a query to a search engine to identify crowdsourced information that describes the software and hardware requirements to support proper processing of the workload. Crowdsourcing is referred to herein as a collection of information or work that in an embodiment is not present within the knowledge base (160). In an exemplary embodiment, the crowdsourced information is a web page or an alternative data source external to the knowledge base (160). Similarly, in an embodiment, the crowdsourced data is unstructured. A structured data type is a form of user-defined data type that contains a sequence of attributes, each of which has a data type. An attribute is a property that helps described an instance of the type. Unstructured data is data that does not contain such attributes, and as such is subjected to natural language processing to identify content therein. With respect to compatibility to support effective and efficient processing of the workload, the collection of information is directed at sources on a distributed network that lists or outlines hardware, software, and associated libraries to support the workload. Accordingly, the data manager (152) leverages a search engine to identify unstructured crowdsourced data associated with application artifacts corresponding to a workload.

As shown, the NLP manager (154) is operatively coupled to the data manager (152). The NLP manager (154) functions to apply NLP to the crowdsourced information, also referred to herein as unstructured data as identified by the data manager (152). Application of NLP to the crowdsourced information is conducted to facilitate and enable identification of one or more host requirements as related to the workload. NLP is extended to the identified unstructured data to analyze text data, and more specifically to parse the web page or other crowdsourced data and identify one or more relevant and appropriate sections within the crowdsourced data that contains information, e.g. hardware, software, and corresponding library information, as host requirements in support of efficiently and effectively processing the workload. In an embodiment, the NLP manager (154) applies an artificial neural network (ANN) to the unstructured data and leverages machine learning (ML) techniques to identify the host requirements. In an embodiment, the NLP manager (154) identifies one or more header sections in the unstructured data and classifies each header section. Accordingly, the NLP manager (154) applies NLP to the unstructured data identified by the data manager (152) for an initial identification of host requirements in support of efficient and effective processing of the workload.

As shown herein, the NLP manager (154) is operatively coupled to the director (156). After identifying host requirements necessary to run the workload, the NLP manager (154) interfaces with the director (156) for identification of a compatible host and scheduling of the workload. The director (156) functions to selectively identify one or more hosts in the computing environment that are compatible with the one or more host requirements identified by the NLP manager (154). The identified host may be a single server or machine for enabling the workload, or in an exemplary embodiment, may utilize two or more servers that act as one system. An existing host is pre-configured with hardware, software, and associated libraries. As shown herein by way of example, server (190) may be a host with tools configured to support the workload. The server (190) is shown herein with an operatively coupled host library (190$_B$) stored in the non-volatile storage (190$_A$). Compatibility of the identified host requirements with the host, also referred to as an initial or preliminary host, is subject to discovery, which in an exemplary embodiment utilizes NLP. The director (156) utilizes NLP to identify and compare installed software names and versions of both the preliminary host library and the application artifacts associated with the workload to support a comparison. The director (156) utilizes the host requirement information discovered by the NLP manager (154) to conduct a comparison to ascertain if the NLP discovered information for the software package matches with the software package in the preliminary host library. Accordingly, the director (156) employs NLP to conduct discovery related to compatibility information between the host requirements associated with the application artifacts and the preliminary host.

As further shown, a scheduling manager (158) is operatively coupled to the data manager (152), NLP manager (154) and director (156). The scheduling manager (158) is configured to selectively schedule the workload responsive to the initial, or the preliminary, host identification by the director (156). The scheduling manager (158) assesses the compatibility of the workload with the identified one or more hosts, and responsive to a determination of compatibility schedules the workload on the identified host. In an exemplary embodiment, a compatibility matrix is identified in the crowdsourced data. The compatibility matrix conveys requirements to support the workload, with the requirements includes elements such as hardware, software, and libraries. The scheduling manager (158) may leverage an identified compatibility matrix to compare the workload requirements with the host configuration, including one or more host embedded configuration elements directed at the hardware, software, and libraries. In an embodiment the director (156) may be unable to identify an existing host that is compatible with the identified host requirements as articulated in the workload. Responsive to a host not being identified, the scheduling manager (158) can create a new host that is compatible to run the workload. The crowdsourced information identifies or otherwise articulates hardware and software, as well as libraries, that are needed in a host to support a corresponding workload, as expressed in the application artifacts. In the event a compatible host is not identified, the scheduling manger (158) leverages the identified workload support information in the crowdsourced to create a configuration file, which is then utilized to create a host in support of the workload. The creation of the configuration file is discussed in greater detail in FIG. 4. The configuration file includes the identified host requirements associated with the workload. The scheduling manager (158) leverages the created configuration file to configure the new host to support the workload runtime requirements. Accordingly, responsive to a compatible host being identified the scheduling manager (158) schedules the workload, and in the event a compatible host is not identified, creates a configuration file which is leveraged to create a new host which is compatible with the workload.

In some illustrative embodiments, server (110) may be the IBM Watson® system available from International Business Machines Corporation of Armonk, New York, which is augmented with the mechanisms of the illustrative embodiments described hereafter. The data manager (152), NLP manager (154), director (156), and scheduling manager (158), hereinafter referred to collectively as AI tools, are shown as being embodied in or integrated within the AI platform (150) of the server (110). In one embodiment, the AI tools may be implemented in a separate computing system (e.g., 190) that is connected across network (105) to the server (110). Wherever embodied, the AI tools function to support optimizing workload scheduling and provisioning in a distributed shared resource environment.

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190$_A$), and mainframe computer (182) utilizes nonvolatile data store (182*a*). The nonvolatile data store (182$_A$) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 2:
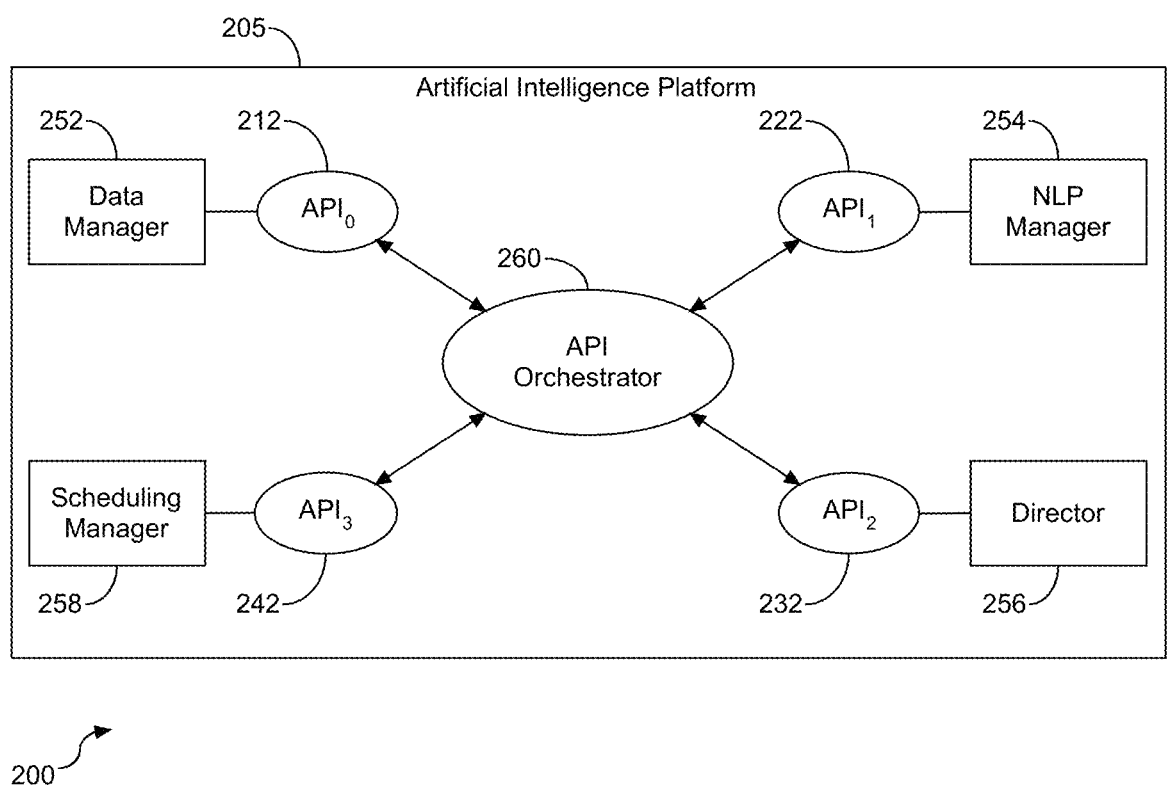
FIG. 2 depicts a block diagram illustrating the AI platform tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152), (154), (156), and (158) and their associated functionality. Referring to FIG. 2, a block diagram (200) is provided illustrating the tools (152), (154), (156), and (158) and their associated APIs. As shown, a plurality of tools are embedded within the artificial intelligence platform (205), with the tools including the data manager (252) associated with $API_0$ (212), the NLP manager (254) associated with $API_1$ (222), the director (256) associated with $API_2$ (232), and the scheduling manager (258) associated with $API_3$ (242). Each of the APIs may be implemented in one or more languages and interface specifications.

As shown, $API_0$ (212) is configured to support and enable the functionality of leveraging unstructured data as they correspond to application artifact related to a workload. $API_1$ (222) provides functional support directed at NLP, and more specifically to apply NLP to the unstructured data and leverage the NLP to identification host requirements that correspond to the application artifacts as represented by the workload. $API_2$ (232) provides functional support to select and identify hosts in the distributed system of resources that are compatible and configured to support the workload. $API_3$ (242) provides functional support to assess compatibility between the application workload and the identified one or more hosts, and to selectively schedule the workload based on the assessment. As shown, each of the APIs (212), (222), (232), and (242) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
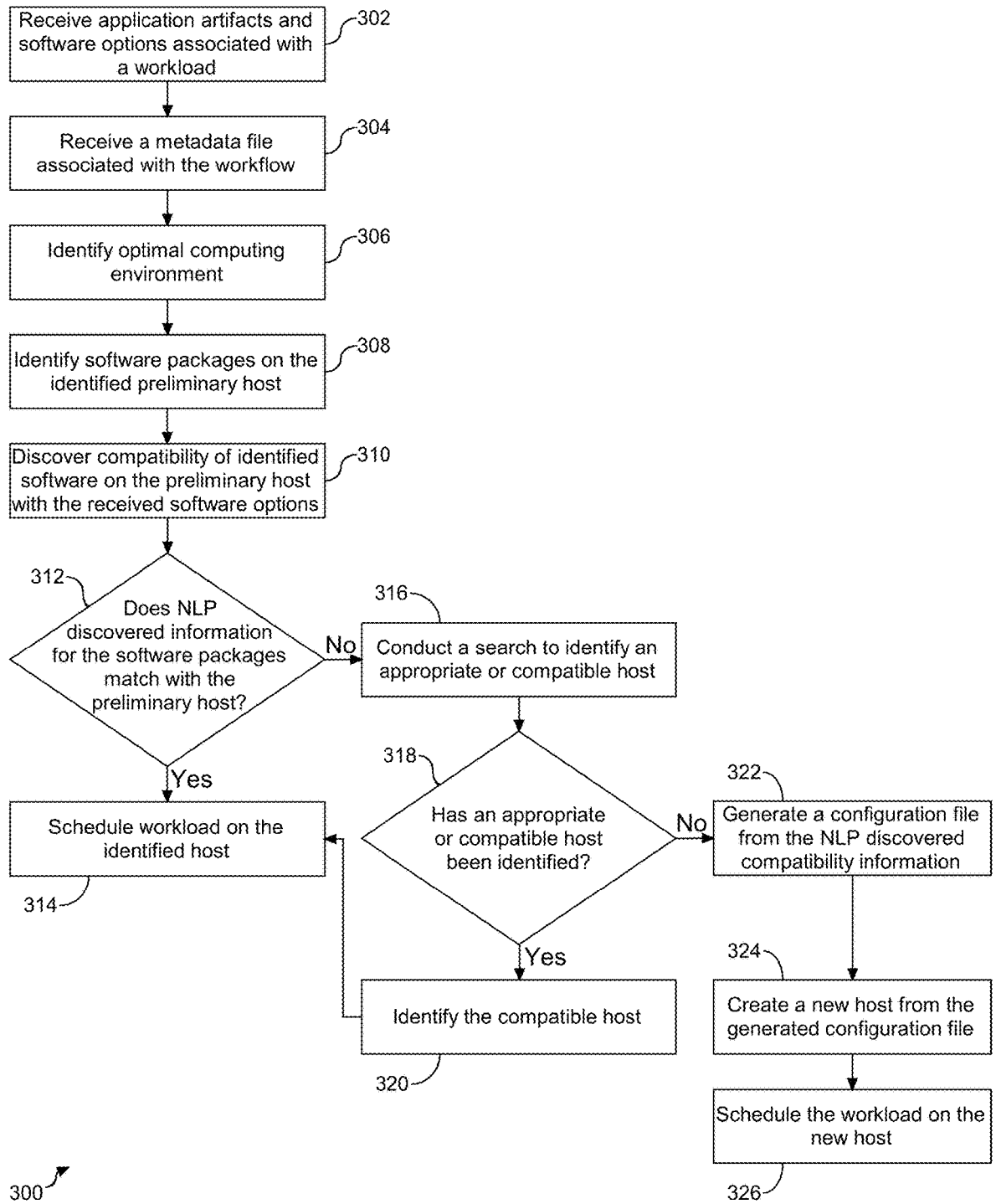
FIG. 3 depicts a flow chart illustrating a process for identifying a host for a scheduled workload or for scheduling a workload.

One of the increasing challenges associated the advent of artificial intelligence (AI) and machine learning (ML) is computing power. It is recognized that AI and ML demand increasing processing power. In an exemplary embodiment, AI and ML make use of one or more graphs processing units, GPUs, to accelerated graphics rendering. It is understood in the art that GPUs and their processing power are useful for ML applications. Before configuring a new host for a workload, a process is conducted to ascertain if there is a configured host available and configured to support the workload, or if there is a configured host that can be leveraged to support the workload. In an exemplary embodiment, a configured host would be a machine with hardware elements or allocated hardware elements required to support the workload. Referring to FIG. 3, a flow chart (300) is provided illustrating a process for identifying a host for a scheduled workload or for scheduling a workload. As shown, a list of software options and application artifacts associated with a workload are received, or otherwise ascertained (302). In an exemplary embodiment, the list of software options may be ranked or otherwise ordered, such as a linear ordering or a hierarchical ordering. Examples of application artifacts include, but are not limited to, application source code, testing code, application programming interface (API) specifications, application configurations, deployment scripts, and variables. Following receipt of the application artifacts and software options at step (302), a metadata file associated with the workload is received from the user (304). In an exemplary embodiment, each workload has a metadata file that contains information about the software version being used in the workload and hardware and software drivers that are required to support the received application artifacts. Accordingly, a ranked list of software options and application artifacts associated with a workload are received from a user along with a metadata file associated with the workload.

Information contained in the metadata file received in step (304) is used to identify an optimal compute environment that can run or efficiently support the software associated with the workload (306). Examples of compute environments are directed at physical environments, such as a bare-metal computer, or a personal computer such as a laptop or desktop computer, and a virtual environment, such as a container, or a virtual machine. A container is a software package that contains everything needed to run in a single package across different computing environments. This includes the executable program as well as system tools, libraries, and settings. A virtual machine (VM) is a virtual representation, or emulation, of a physical computer. In an embodiment, the VM is an image file that exhibits behavior of a separate computer, capable of performing tasks, such as running applications and programs. Accordingly, the VM is a software application that performs most functions of a physical computer, and behaving as a separate computer system.

The compute environments shown and described herein are exemplary and are not meant to be limiting as other compute environments not listed may be possible. The physical compute environment that is selected or identified to support the workload commensurate with the data received at steps (302) and (304) is referred to herein as a host, and is a preliminary host selection or identification. It is understood in the art that in an exemplary embodiment, an existing host may be pre-configured or configured with software. Following the identification of the optimal compute environment at step (306), which may also be referred to herein as a preliminary host identification, software packages on the identified compute environment are identified (308). Accordingly, the initial compute environment selection is considered preliminary and is based on both the artifacts and associated metadata received at steps (302) and (304), respectively.

The preliminary host identification or selection is based on a previously configured host in a distributed resource environment, also referred to herein as a cloud computing environment. The identified host may be a single server or machine for enabling the workload, or in an exemplary embodiment, may utilize two or more servers that act as one system. Whether a single server or two or more servers, an existing host is pre-configured with hardware, software, and associated libraries. Compatibility of the identified software on the preliminary host with the software options provided by the user corresponding to the workload is subject to discovery (310), which in an exemplary embodiment utilizes NLP. Details of utilization of the NLP are shown and described in FIG. 4. The NLP is utilized to identify and compare installed software names and versions of both the preliminary host and the application artifacts to support a comparison. In an exemplary embodiment, unstructured crowdsourced data is searched or otherwise leveraged to identify hardware and software requirements of the host machine to support and enable processing of the workload. As shown herein, following the information discovery at step (310), a comparison is conducted to ascertain if the NLP discovered information for the software package matches with software installed on the preliminary host (312). A positive response to the determination at step (312) indicates that the preliminary host is compatible with the workload and the workload is scheduled to be run on the identified preliminary host (314). Accordingly, NLP is employed to conduct discovery related to compatibility information between the application artifacts and the preliminary host.

It is understood that the host subject to evaluation may not be properly configured or enabled for the application artifacts and corresponding workload, as demonstrated herein by a negative response to the determination at step (312). The discovery at step (310) identifies the software requirements of the host to support the workload, regardless of whether the preliminarily identified host results in compatibility. As shown, the negative response to the match assessment is followed by leveraging the discovered compatibility requirements for the workload and conducting a search to identify an appropriate or compatible host for the application (316). This is followed by ascertaining whether the search produced an appropriate or compatible host (318). In an embodiment, the host compatibility assessment utilizes host configuration settings and compatibility of those settings to support the workload. A positive response to the determination at step (318) is followed by identification or selection of the compatible existing host (320) and a return to step (314) to schedule the workload on the selected or identified host. However, a negative response to the determination at step (318) indicates that either a compatible host for the workload was not found or such a host does not exist within the available resources. To support the workload, the NLP discovered compatibility information is leveraged and a configuration file is generated (322). The generated configuration file is utilized to create a host that is compatible with the workload (324). Creating the new host creates a new deployment option that may be virtual, such as containers and virtual machines, or physical, or a combination of virtual and physical. Generation of the configuration file is shown and described in detail in FIG. 4. Following the creation of the new host, the workload is scheduled on the new host (326). Accordingly, the NLP discovered compatibility information is utilized to identify an existing host to run the workload, and in the event an existing host cannot be identified, the NLP discovered compatibility information is utilized as a source to generate a configuration file to create a new host.

Figure 4:
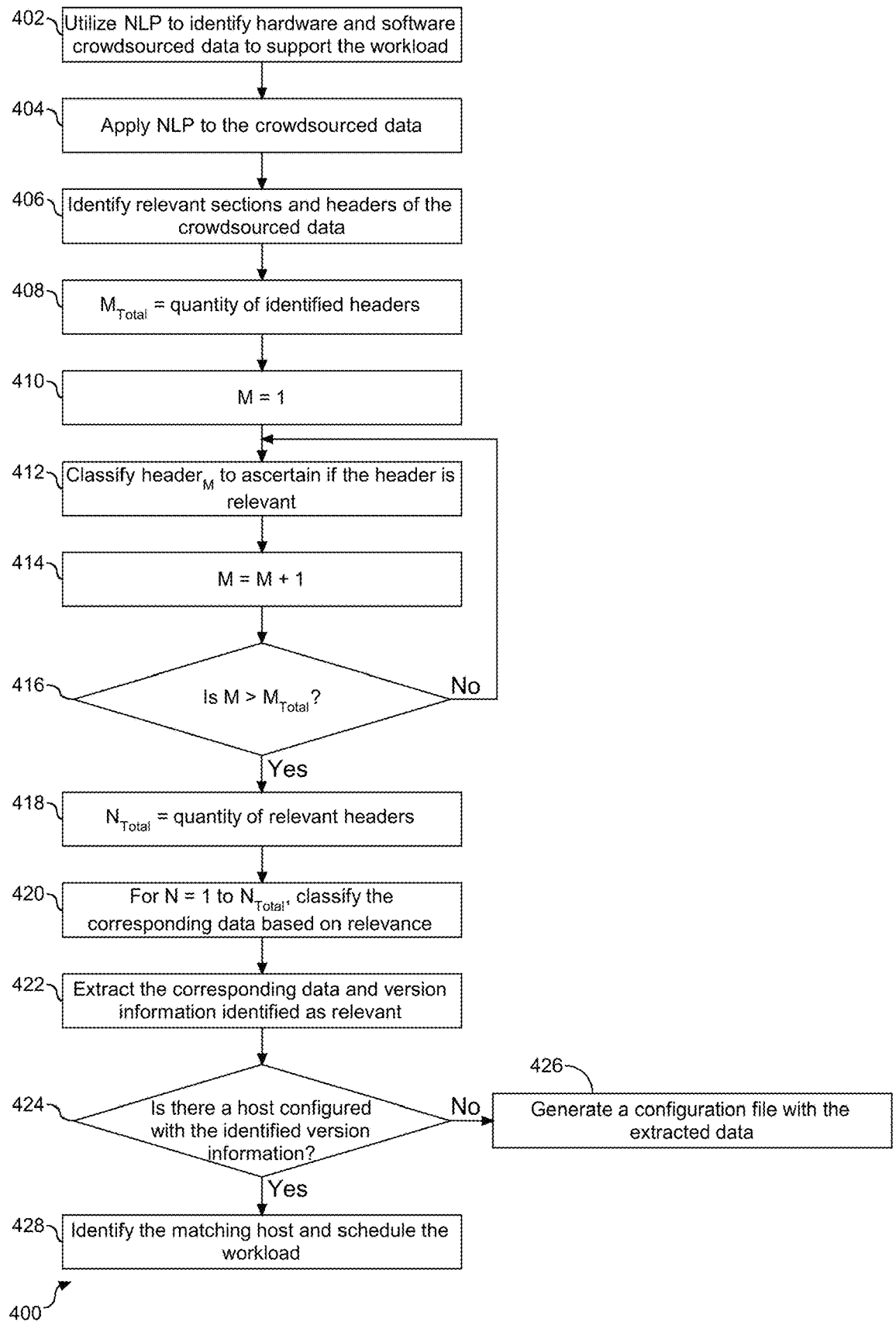
FIG. 4 depicts a flow chart illustrating a process for leveraging NLP to generate a configuration file.

Referring to FIG. 4, a flow chart (400) is provided illustrating a process for leveraging NLP to generate a configuration file. As shown and described in FIG. 3, application artifacts associated with a workload are used as input to a search engine to conduct an initial or preliminary investigation to identify hardware and software of a host to support the application workload (402). In an exemplary embodiment, preliminary investigation at step (402) leverages a search engine to identify crowdsourced information articulating the hardware and software requirements to support the workload. Crowdsourcing is referred to herein as a collection of information or work, with the crowdsourced data being unstructured. A structured data type is a form of user-defined data type that contains a sequence of attributes, each of which has a data type. An attribute is a property that helps described an instance of the type. Unstructured data is data that does not contain such attributes. With respect to compatibility to support effective and efficient processing of a workload, the collection of information is directed at sources on a distributed network that lists or outlines hardware, software, and associated libraries to support the workload. NLP from the initial investigation is applied to the identified crowdsourced venue, and to analyze the NL data therein (404). In an embodiment, the analysis at step (404) is directed at identification of appropriately classified information. In an exemplary embodiment, the application at step (404) is directed to a search engine to identify a corresponding web page that describes the software and hardware requirements to support proper processing of the workload. For example, a vendor of a software product or package may have a page that lists corresponding hardware, software, and libraries needed to efficiently and effectively support the workload. It is understood in the art that a page of information may include extraneous information that is irrelevant to the scope of the search. As such, following step (404), the identified crowdsourced data is analyzed as a text block, with each text block assigned labels, shown and described herein as a header label and a section label. In an exemplary embodiment, the labels may be combined into a single label, or extended to include additional labels. Accordingly, the quantity of labels shown and described herein should not be considered limiting.

NLP is extended to the identified page to analyze the page text, and more specifically to parse the web page or other crowdsourced data source and identify one or more relevant and appropriate sections within the page that contains information, e.g. hardware, software, and corresponding library information, in support of efficiently and effectively processing the software package (406). In an embodiment, the crowdsourced data is a hypertext markup language page that is analyzed as a text block. It is understood that the crowdsourced data may have a plurality of sections therein, with different sections represented by corresponding headers. Accordingly, NLP is utilized for an initial identification of crowdsourced data as related to the application workload.

The NLP of the crowdsourced data is an initial processing of the NL data therein, including an initial identification of headers. As shown and described herein, the headers and their corresponding content are subject to ML techniques on one or more corresponding artificial neural networks to facilitate identification of information as directed to the application workload in view of the identified headers. The variable $M_{Total}$ is assigned to represent the quantity of initial or preliminarily identified headers (408), and a corresponding header counting variable, M, is initialized (410). One or more ML techniques are applied to the headers to facilitate their classification. As shown and described herein, supervised learning, such as but not limited to logistic regression, is employed to classify header$_M$ to ascertain if the header is a desired header (412). In an exemplary embodiment, output from the ML technique at step (412) is a binary classification of the header. Following step (412), the preliminary header counting variable, M, is incremented (414), and it is then ascertained if each of the preliminary headers have been processed (416). A negative response to the determination at step (416) is followed by a return to step (412) for continued review and classification of the preliminarily identified headers. It is understood that the header analysis may produce a subset of headers that are considered relevant or pertinent to the application workload. Following a positive response to the determination at step (416), the variable $N_{Total}$ is assigned to the quantity of headers determined to be relevant (418), which in an embodiment may be a subset of the preliminary identified headers, as represented by the variable $M_{Total}$. In an exemplary embodiment, each of the preliminary headers may be considered relevant, and in this case, the variable $N_{Total}$ is equivalent to the variable $M_{Total}$. Accordingly, the initial ML technique is directed at the headers and binary classification thereof.

Following step (418), data within the sections within the crowdsourced data as identified by the relevant headers is subject to a second ML technique to classify the data. As shown herein, for each of the relevant headers $N_{Total}$, the second ML technique is applied to the data or section of data as identified by the corresponding header, e.g. header$_N$, to classify the corresponding data (420). In an embodiment, the data classification is directed at usefulness of the data with respect to the application workload. Similarly, in an exemplary embodiment, the second ML technique is a supervised learning technique, such as linear regression. Following the identification of relevant sections of information on the webpage, version information is extracted from the user provided software package(s), e.g. the software artifacts (422). A determination is conducted to ascertain if there is a host configured with the version information as identified by the information within the appropriate or relevant sections of the page as identified by the corresponding header(s) and corresponding to the software artifacts (424). In an exemplary embodiment, the match assessment at step (424) does not have to be an exact match. For example, in an embodiment, the match assessment may be directed to a partial match and directed at compatibility of a different version of hardware and software drivers as indicated in the corresponding libraries. As an example, in an embodiment, the information on the page may identify one or more hardware or software drivers and corresponding version identifiers that may be compatible with or support the software artifacts. A negative response to the determination at step (424) is followed by creating or generating configuration file with the discovered hardware and software libraries with respect to the most recent version of the software (426). In an exemplary embodiment, the hardware and software libraries are discovered through application of the one or more of the first and second ML techniques and output from the artificial neural network. The configuration file may then be leveraged to create a host to support the application workload. Conversely, a positive response to the determination at step (424) is followed by identification of the matching host and scheduling the application workload (428). Accordingly, ML techniques may be directed at crowdsourced information to facilitate identification of a host for scheduling a workload that includes a compatibility assessment before scheduling the application workload.

Aspects of optimizing workload scheduling and provisioning in a distributed shared resource environment are shown and described with the tools and APIs shown in FIGS. 1 and 2, respectively, and the processes shown in FIGS. 3 and 4. Aspects of the functional tools (152), (154), (156), and (158) and their associated functionality may be embodied in a computer system/server in a single location, or in one embodiment, may be configured in a cloud-based system sharing computing resources. With references to FIG. 5, a block diagram (500) is provided illustrating an example of a computer system/server (502), hereinafter referred to as a host (502) in communication with a cloud-based support system, to implement the processes described above with respect to FIGS. 3 and 4. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments (510) where tasks are performed by remote processing devices that are linked through a communications network. In a distributed cloud computing environment, program modules may be located in both local and remote computer system storage media including memory storage devices.

Figure 5:
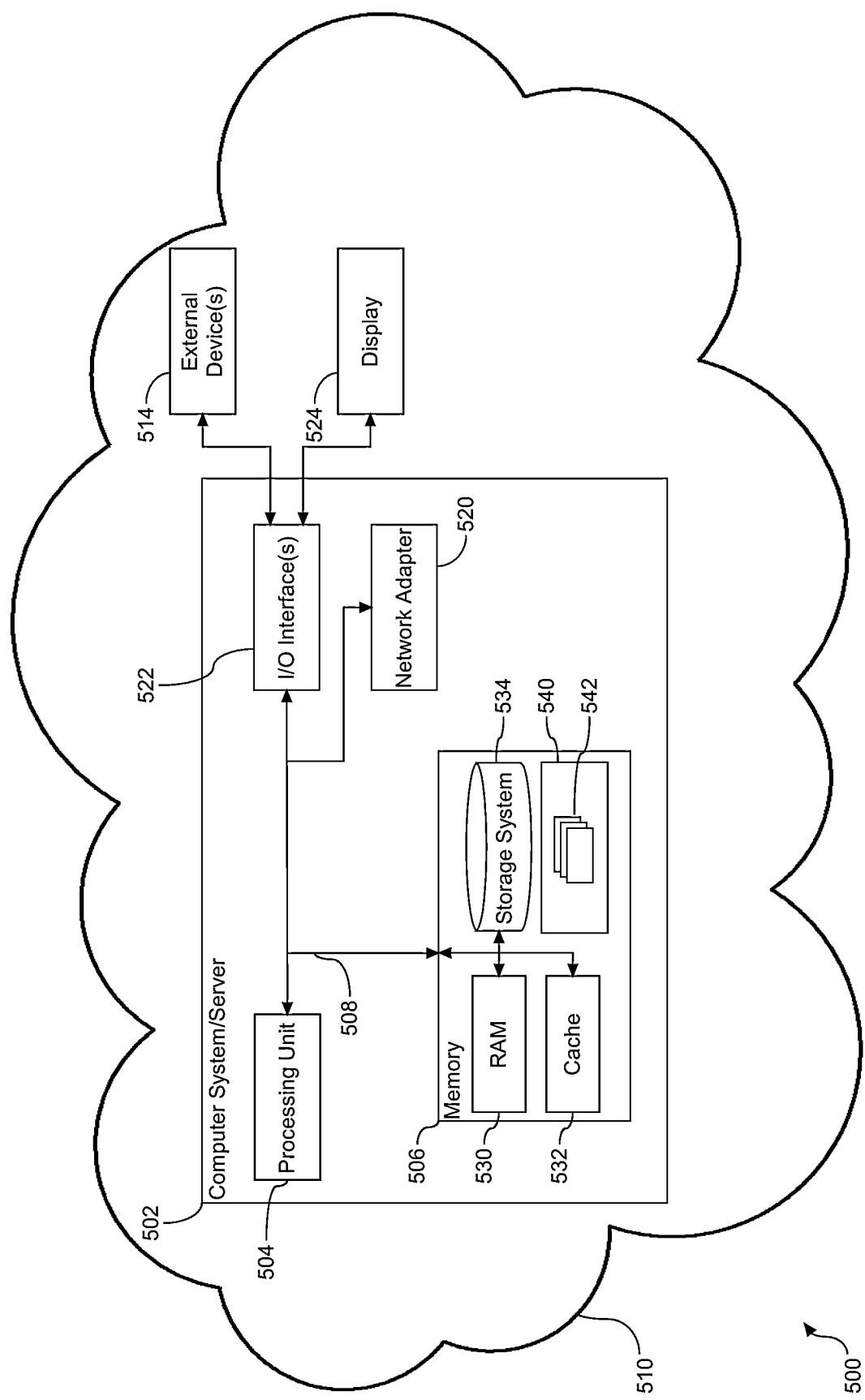
FIG. 5 depicts a block diagram illustrating an example of a computer system/server of a cloud based support system, to implement the system and processes described above with respect to FIGS. 1-4.

As shown in FIG. 5, host (502) is shown in the form of a general-purpose computing device. The components of host (502) may include, but are not limited to, one or more processors or processing units (504), e.g. hardware processors, a system memory (506), and a bus (508) that couples various system components including system memory (506) to processing unit (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to optimize workload scheduling and provisioning in a distributed shared resource environment. For example, the set of program modules (542) may include the tools (152), (154), (156), and (158) as described in FIG. 1.

Host (502) may also communicate with one or more external devices (514), such as a keyboard, a pointing device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
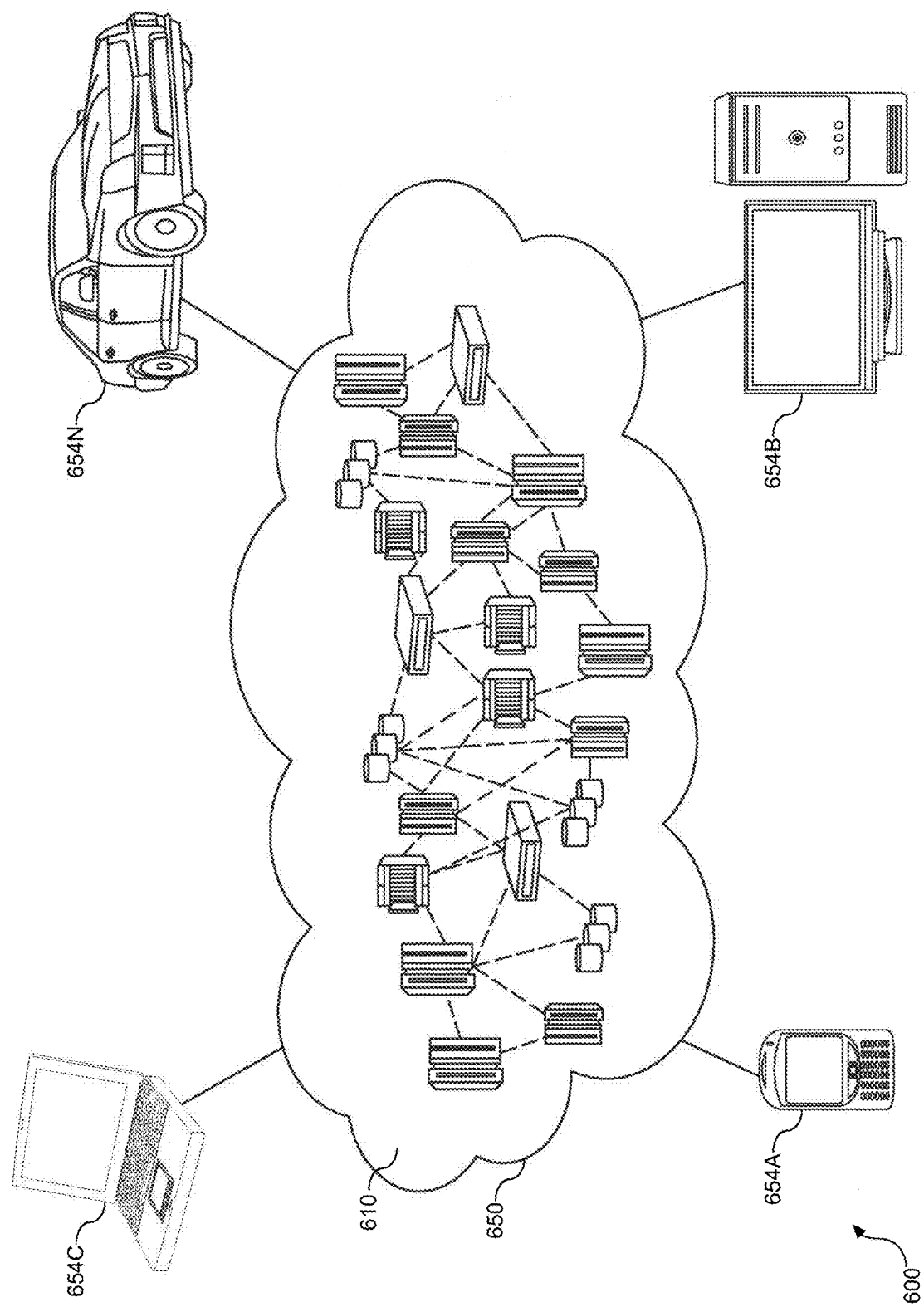
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (654A-N) shown in FIG. 6 are intended to be illustrative only and that the cloud computing environment (650) can communicate with any type of computerized device over any type of network and/or network addressable connection (e.g., using a web browser).

Figure 7:
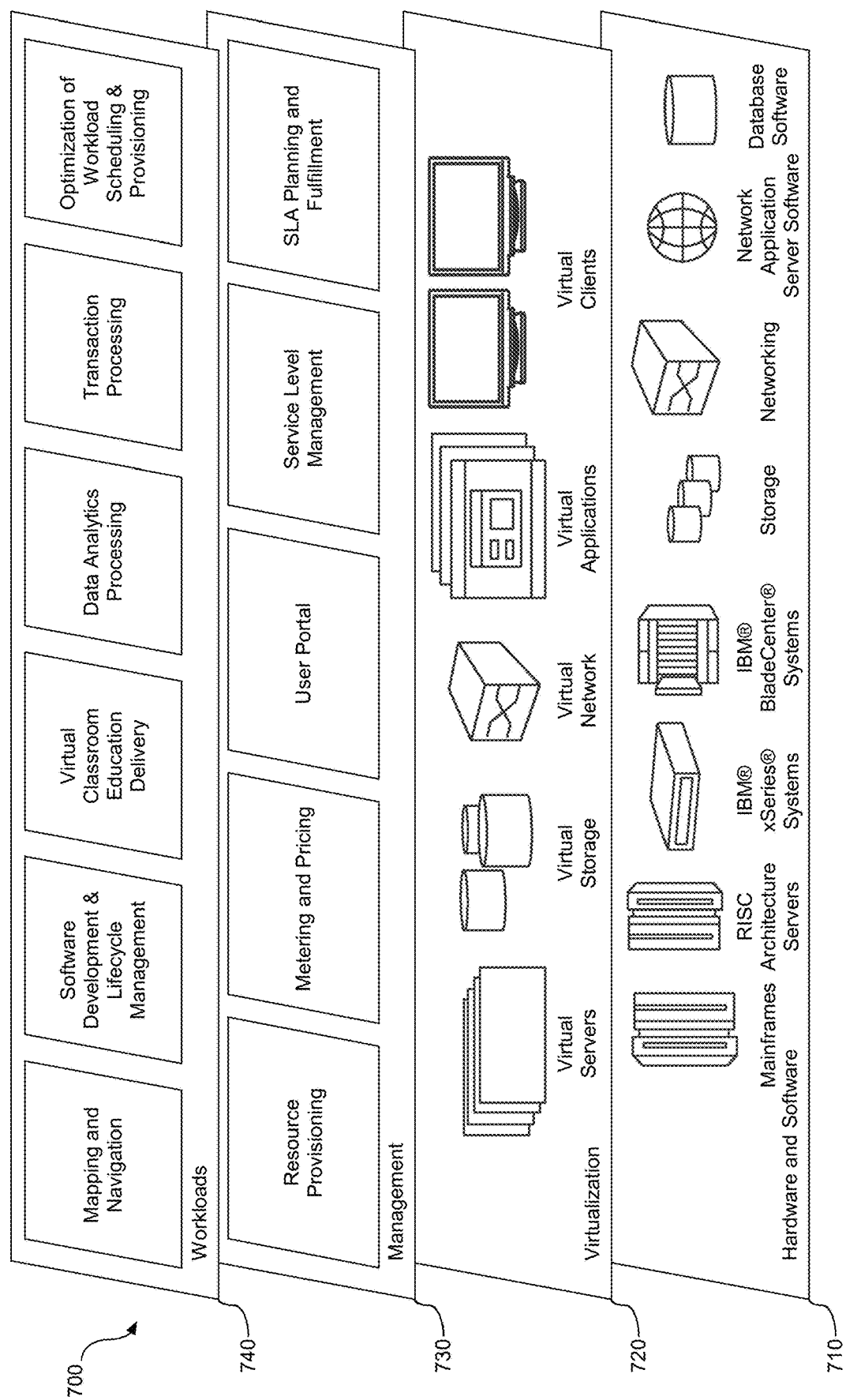
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740).

The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and optimization of workload scheduling and provisioning.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an AI platform to automatically and selectively optimize DevOps pipeline artifacts based on identified changes by learning dependencies.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, natural language processing may be carried out by different computing platforms or across multiple devices. Accordingly, the scope of protection of the embodiments is limited only by the following claims and their equivalents.

What is claimed is:

1. A computer system comprising:
   a processing unit operatively coupled to memory;
   an artificial intelligence (AI) platform operatively coupled to the processing unit, the AI platform configured with one or more tools to support optimization of workload scheduling, the one or more tools comprising:
      a data manager configured to leverage one or more application artifacts related to a workload to identify host requirement data;
      a natural language processing (NLP) manager configured to apply NLP to the data, the NLP to identify one or more host requirements corresponding to the one or more application artifacts;
      a director configured to selectively identify one or more hosts in the computing environment compatible with the identified one or more host requirements; and
      a scheduling manager operatively coupled to the director and configured to selectively schedule the workload responsive to the selective host identification, including assess compatibility of the workload with the identified one or more hosts; and selective execution of the scheduled workload on at least one of the selectively identified hosts responsive to the assessment workload compatibility.

2. The computer system of claim 1, further comprising the NLP manager to apply the unstructured data to an artificial neural network and leverage one or more machine learning (ML) techniques to identify the host requirements, and selectively executing the scheduled workload on the identified host.

3. The computer system of claim 2, further comprising the scheduling manager to configure a new host for the workload responsive to the selective compatibility identification, including:

create a configuration file with output leveraged from the artificial neural network, wherein the created configuration file includes the identified one or more host requirements;

leverage the created configuration file and configure the new host to support workload runtime requirements characterized in the configuration file; and selectively execute the scheduled workload on the configured new host.

4. The computer system of claim 3, further comprising the director to leverage a first artificial neural network (ANN) and a supervised machine learning algorithm to identify one or more header sections and one or more section classifications of the unstructured data, the supervised machine learning to generate output classify the one or more identified section headers.

5. The computer system of claim 4, further comprising the director to leverage a second ANN to identify a desired section of the unstructured data responsive to the classified one or more identified section headers.

6. The computer system of claim 1, wherein the one or more application artifacts comprises program code and code dependencies.

7. A computer program product to support optimization of workload scheduling, the computer program product comprising a computer readable storage medium having program code embodied therewith, the program code executable by a processor to:

leverage one or more application artifacts related to a workload to identify host requirement data;

apply NLP to the data, the NLP to identify one or more host requirements corresponding to the one or more application artifacts;

selectively identify one or more hosts in the computing environment compatible with the identified one or more host requirements;

selectively schedule the workload responsive to the selective host identification, including assess compatibility of the workload with the identified one or more hosts; and selectively execute the scheduled workload on at least one of the selectively identified hosts responsive to the assessment workload compatibility.

8. The computer program product of claim 7, further comprising program code to apply the unstructured data to an artificial neural network and leverage one or more machine learning (ML) techniques to identify the host requirements, and selectively execute the scheduled workload on the identified host.

9. The computer program product of claim 8, further comprising program code to configure a new host for the workload responsive to the selective compatibility identification, including the program code to:

create a configuration file with output leveraged from the artificial neural network, wherein the created configuration file includes the identified one or more host requirements;

leverage the created configuration file and configure the new host to support workload runtime requirements characterized in the configuration file; and selectively execute the scheduled workload on the configured new host.

10. The computer program product of claim 9, further comprising program code to leverage a first artificial neural network (ANN) and a supervised machine learning algorithm to identify one or more header sections and one or more section classifications of the unstructured data, the supervised machine learning algorithm to generate output to classify the one or more identified section headers.

11. The computer program product of claim 10, further comprising program code to leverage a second ANN to identify a desired section of the unstructured data responsive to the classified one or more identified section headers.

12. The computer program product of claim 7, wherein the one or more application artifacts comprises program code and code dependencies.

13. A computer-implemented method comprising:

leveraging one or more application artifacts related to a workload to identify host requirement data;

employing natural language processing (NLP) to the data, the NLP identifying one or more host requirements corresponding to the one or more application artifacts;

selectively identifying one or more hosts in the computing environment compatible with the identified one or more host requirements;

selectively scheduling the workload responsive to the selective host identification, including assessing compatibility of the workload with the identified one or more hosts; and selectively executing the scheduled workload on at least one of the selectively identified hosts responsive to the assessment workload compatibility.

14. The computer-implemented method of claim 13 wherein the selectively identified one or more hosts further comprises applying the unstructured data to an artificial neural network and leveraging one or more machine learning (ML) techniques to identify the host requirements, and selectively executing the scheduled workload on the identified host.

15. The computer-implemented method of claim 14, further comprising configuring a new host for the workload responsive to the selective compatibility identification, the configuring further comprising:

creating a configuration file with output leveraged from the artificial neural network, wherein the created configuration file includes the identified one or more host requirements;

leveraging the created configuration file and configuring the new host supporting workload runtime requirements characterized in the configuration file; and selectively executing the scheduled workload on the configured new host.

16. The computer-implemented method of claim 15, further comprising leveraging a first artificial neural network (ANN) and a supervised machine learning algorithm for identifying one or more header sections and one or more section classifications of the unstructured data, the supervised machine algorithm to generate output classifying the one or more identified section headers.

17. The computer-implemented method of claim 16, further comprising leveraging a second ANN for identifying a desired section of the unstructured data responsive to the classified one or more identified section headers.

18. The computer-implemented method of claim 13, wherein the one or more application artifacts comprises program code and code dependencies.

\* \* \* \* \*